(12) United States Patent
Ten Kate

(10) Patent No.: US 7,496,833 B1
(45) Date of Patent: Feb. 24, 2009

(54) METHOD OF CODING A DOCUMENT

(75) Inventor: Warner R. T. Ten Kate, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,567

(22) Filed: Mar. 9, 2000

(30) Foreign Application Priority Data

Mar. 9, 1999 (EP) ................................ 99200663

(51) Int. Cl.
*G06F 3/00* (2006.01)
*G06F 17/00* (2006.01)

(52) U.S. Cl. ........................ 715/234; 715/236; 715/255; 715/730; 707/100

(58) Field of Classification Search ............... 715/501.1, 715/500.1, 513, 526, 200–202, 204, 205, 715/234–237, 239, 243, 249, 255, 700–732, 715/760; 709/218, 231; 707/1, 100, 101, 707/102

See application file for complete search history.

(56) References Cited

U.S. PATENT DOCUMENTS

| | | | | | |
|---|---|---|---|---|---|
| 5,515,490 | A | | 5/1996 | Buchanan et al. | 395/154 |
| 5,613,909 | A | * | 3/1997 | Stelovsky | 463/1 |
| 5,659,793 | A | * | 8/1997 | Escobar et al. | 715/500.1 |
| 5,696,948 | A | * | 12/1997 | Cruz et al. | 702/176 |
| 5,724,605 | A | * | 3/1998 | Wissner | 715/500.1 |
| 5,860,073 | A | * | 1/1999 | Ferrel et al. | 715/522 |
| 5,892,507 | A | * | 4/1999 | Moorby et al. | 715/500.1 |
| 5,899,975 | A | * | 5/1999 | Nielsen | 704/270.1 |
| 6,342,907 | B1 | * | 1/2002 | Petty et al. | 715/762 |
| 6,418,441 | B1 | * | 7/2002 | Call | 707/10 |
| 6,426,778 | B1 | * | 7/2002 | Valdez, Jr. | 348/461 |
| 6,463,440 | B1 | * | 10/2002 | Hind et al. | 707/102 |
| 6,507,856 | B1 | * | 1/2003 | Chen et al. | 715/513 |
| 6,544,294 | B1 | * | 4/2003 | Greenfield et al. | 715/526 |
| 6,546,405 | B2 | * | 4/2003 | Gupta et al. | 715/512 |
| 6,564,263 | B1 | * | 5/2003 | Bergman et al. | 709/231 |
| 6,589,291 | B1 | * | 7/2003 | Boag et al. | 715/513 |
| 6,594,691 | B1 | * | 7/2003 | McCollum et al. | 709/218 |
| 6,748,569 | B1 | * | 6/2004 | Brooke et al. | 715/207 |
| 6,812,941 | B1 | * | 11/2004 | Brown et al. | 715/854 |

(Continued)

FOREIGN PATENT DOCUMENTS

WO    WO 0135056 A1 * 5/2001

OTHER PUBLICATIONS

Song et al., "Modeling timed user-interactions in multimedia documents", Proceedings of Multimedia' 1996, IEEE, pp. 407-416.*

(Continued)

*Primary Examiner*—Doug Hutton
*Assistant Examiner*—Maikhanh Nguyen

(57) ABSTRACT

The invention relates to a method of coding a document for presentation on a presentation apparatus, comprising a step of defining a body section which specifies a structure of said document in terms of document elements, for example chapters and paragraphs. The method according to the invention also comprises a step of defining a time section including a time constraint which acts upon document elements in the structure section, and a step of linking the time section with the structure section to establish the coding of the document. The time section describes the temporal behavior of the document elements in the body section.

11 Claims, 3 Drawing Sheets

U.S. PATENT DOCUMENTS

Figure 1:
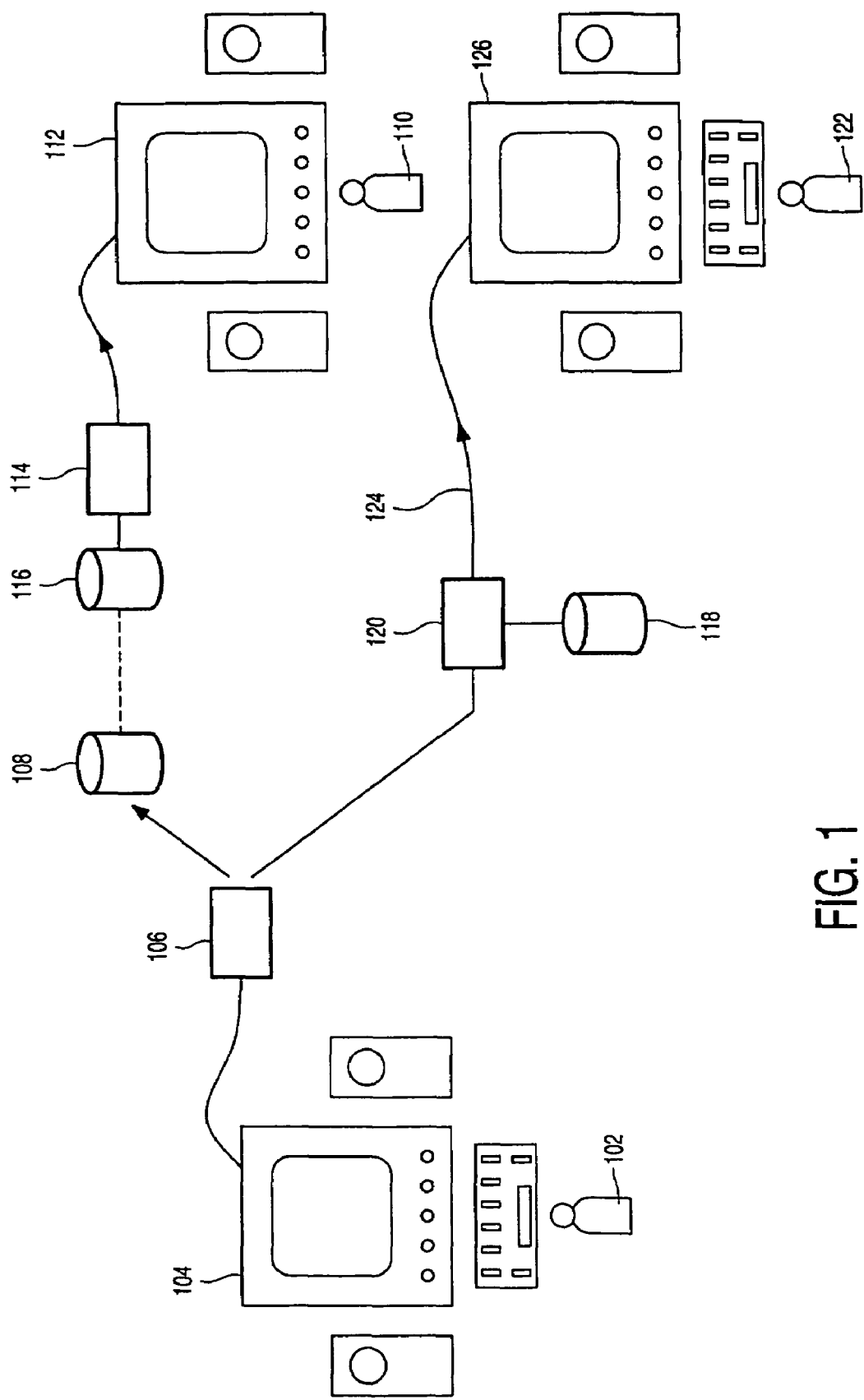

| | | |
|---|---|---|
| 6,910,182 B2 * | 6/2005 | Huang .................... 715/514 |
| 6,920,607 B1 * | 7/2005 | Ali et al. .................. 715/501.1 |
| 2002/0059342 A1 * | 5/2002 | Gupta et al. ............... 707/512 |

OTHER PUBLICATIONS von Westarp et al., "Internet-based corporate reporting-filing the Standardization Gap", IEEE, Jan. 1999, pp. 1-10.*

Rutledge et al., "Implementing Adaptability in the Standard Reference Model for Intelligent Multimedia Presenation Systems", IEEE, Oct. 1998, pp. 1-9.*

Marden et al., "Today's Style Sheet Standards: The Great Vision Blinded," IEEE, vol. 32, No. 11, Nov. 1999, pp. 123-125.*

Korpela et al., "Lurching Toward Babel: HTML, CSS, and XML," IEEE, vol. 31, No. 7, Jul. 1998, pp. 103-104, 106.*

J. Lubell, "Structured Markup on the Web," Markup Languages, 1999, pp. 7-22.*

Rutledge et al., "Practical Application of Existing Hypermedia Standards and Tools", Proc. of the 3rd ACM Conf., on Digital Libraries, Jun. 23, 1998, pp. 191-199.*

S. Adler, "The ABCs of DSSSL", Journal of the American Society For Information Sciense, Dec. 7, 1997, pp. 597-602.*

T. Yoneda et al., "A New Communication Tool: Time Dependent Multimedia Document", IEEE, 1992, pp. 90-97.*

Powell et al.; "HTML Programmer's Reference"; 1998, Osborne/McGraw-Hill, Berkley, USA; XP002140636; p. 183 line 18-p. 190 line 34.

Yoneda et a.; "Constructing a System Using Time Dependent Multimedia Document"; Proceedings of the Annual International Phoenix Conference on Computers and Communicartions; IEEE, vol. Conf. 11, 1992, XP000310603, pp. 140-147.

Bulterman et al.; "GriNS: A Graphical Interface for Creating and Playing SMIL Documents", Computer Networks and ISDN Systems, NL, Amsterdam, vol. 30, No. 1-7, XP004121396, ISSN: 0169-7552, Appendix A, p. 520.

HTML 4.01 Specification, W3C Recommendation, Dec. 24, 1999 http://www.w3.org/TR/REC-html40/.

Cascading Style Sheest, Level 2, CSS2 Specification, May 12, 1998 http://www.w3.org/TR/REC-CSS2/.

* cited by examiner

METHOD OF CODING A DOCUMENT

BACKGROUND OF THE INVENTION

The invention relates to a method of coding a document for presentation on a presentation apparatus, comprising a step of defining a structure section which specifies a structure of said document in terms of document elements.

The invention also relates to a method of presenting a coded document, which is coded in accordance with the above method of coding a document.

The invention also relates to an apparatus for presenting a coded document, which is coded in accordance with the above method of coding a document.

The invention also relates to an information carrier with a coded document, which is coded in accordance with the above method of coding a document.

The invention also relates to an apparatus for coding a document in accordance with the above method of coding a document.

It is known to code a document, for example a text document or a graphics description (vector graphics, 3D graphics world, etc.), into a description according to a given format. The coded document may be transferred via a network or stored on a storage medium for subsequent presentation by a suitable apparatus. An example of such a format is HTML (Hypertext markup language), which combines the concepts of text markup, hyperlinking and URLs (Uniform Resource Locator). Text markup derives from SGML (Standard Generalized Markup Language) and XML (Extensible Markup Language). HTML is in fact a SGML application. XML has been specified by the W3C (World Wide Web Consortium) and can be considered as a simplified version of SGML. Both SGML and XML provide a way to specify structure in documents. 'Structure' refers to the organization of the document and, in case of text, includes matters like paragraph, line break, chapter, etc. The 'style' of presentation is coded separately from the document structure, for example in so-called style-sheets. Style refers to matters like font, page size, colors, line spacing, etc. By separating structure and style, a text document together with its markup can be stored once, and from this basic document various versions can be derived while using different style sheets, for example for paperback, hard-cover, or screen display. Each style sheet contains a number of style rules, each of which assigns style properties to a document element selected from the text document. A document element can be selected from the document by means of, for example, the Cascading Style Sheets (CSS) format as described hereinafter. The HTML standard is described in HTML 4.0 Specification, W3C Recommendation, on the Internet at the W3 organization website at "w3.org/TR/REC-html40", April 1998. The CSS standard is described in the CSS Level 2 Specification W3C Recommendation, at "w3.org/TR/REC-CSS2", May 1998.

Recently, a set of extensions has been proposed to add additional timing, interaction and media delivery capabilities to HTML. These extensions assign timing properties to the document elements, specifying, for example, for how long a particular element should be presented. Using the timing extensions, any HTML element can be set to appear at a given time, to last for a specified duration, and to repeat (i.e. loop). With the advent of such extensions, it is possible for HTML to be a much more powerful medium for coding documents. Designers can now begin to think of documents not just as a static piece of information, but as a dynamic, interactive presentation. Aside from HTML, other XML-applications are foreseen which also demand extension with timing information.

A disadvantage of such timing extensions is that the timing information is intermingled with the document's structure information, this is undesirable if the document has to be presented on various types of equipment with various levels of sophistication, capacity and processing power, and the presentation schedule has to be optimized with respect to these parameters. Moreover, solving this for the HTML case does not offer a general solution for extending other XML-application formats with similar timing constructs as well; this is laborious and confusing.

SUMMARY OF THE INVENTION

It is an object of the invention to provide a method of the type defined in the opening paragraph in which the temporal behavior of a structured document can be specified independently of the applied format and the particular document structure. To this end, the method according to the invention is characterized in that the method also comprises a step of defining a time section including a time constraint which acts upon document elements in the structure section, and a step of linking the time section with the structure section to establish the coding of the document.

In this way it is achieved that no timing extensions to the document coding format are needed. Hence, the invention can be applied to any language, for example HTML, without changing its syntax and semantics. Furthermore, the timing information is completely independent of the document's structure, so that the temporal structure may deviate from the document's structure, and verification and validation of the specified timing can be performed within the scope of the time section itself.

A version of the method according to the invention is characterized in that the time constraint specifies that the document elements it acts upon have to be presented consecutively. In this way a sequence of document elements can be presented successively. Additionally, attributes which prescribe the minimum or maximum duration of the whole sequence or the presentation of individual document elements may be assigned to the time constraint.

A further version of the method according to the invention is characterized in that the method also comprises a step of assigning a substitution indicator to the time constraint which indicates whether the presentation space consumed by a document element has to disappear before presentation of a succeeding document element. If the indicator has the positive value, the succeeding element is presented at the same position as the preceding element. For example, if the document elements are text fragments, each fragment is erased and the succeeding fragment is displayed at the same position.

A version of the method according to the invention is characterized in that the time constraint specifies that the document elements it acts upon have to be presented simultaneously. A sequence of document elements can thus be presented in parallel. A version of the method according to the invention is characterized in that document elements in the structure section which are acted upon by the time constraint are selected by means of a CSS (Cascading Style Sheets) selector syntax. CSS provides a convenient syntax for selecting document elements which may be applied to time sheets as well.

A version of the method according to the invention is characterized in that the method also comprises a step of including into the time section a time constraint which acts upon at least one style rule selected from a style section. The introduction of a separate time section allows not only the specification of the temporal behavior of document elements, but also of style rules specified in a separate style section or style sheet. In this way it is achieved that, for example, the style of a document element changes over time. Using a similar selection mechanism, for example a CSS selector syntax, style rules may be selected from the style section and subjected to a time constraint in the time section.

A version of the method according to the invention is characterized in that the method also comprises a step of assigning an inheritance indicator to a time constraint. Generally speaking, a document's structure comprises hierarchical relationships between document elements, for example a chapter having multiple paragraphs. SGML/XML provides powerful means to specify such tree organizations. The inheritance indicator may be used to determine whether or not the time constraint applies to subordinate elements too.

It is to be noted that it has been proposed to extend style sheets with temporal specifications. In addition to style properties, temporal properties may also be assigned to a selected document element. A disadvantage of this approach is that the time specification depends on information in the document's structure section. For example, when a document element is assigned a 'sequence' property, the document needs to be inspected to learn what elements are involved and how those elements are ordered. Hence, the document's structure also determines the document's temporal behavior, which is undesirable.

The invention is particularly suitable for publishing documents on computer networks, for example the Internet.

These and other aspects of the invention are apparent from and will be elucidated, by way of non-limitative example, with reference to the embodiment(s) described hereinafter. In the drawings,

BRIEF DEFINITION OF THE DRAWINGS

Figure 2:
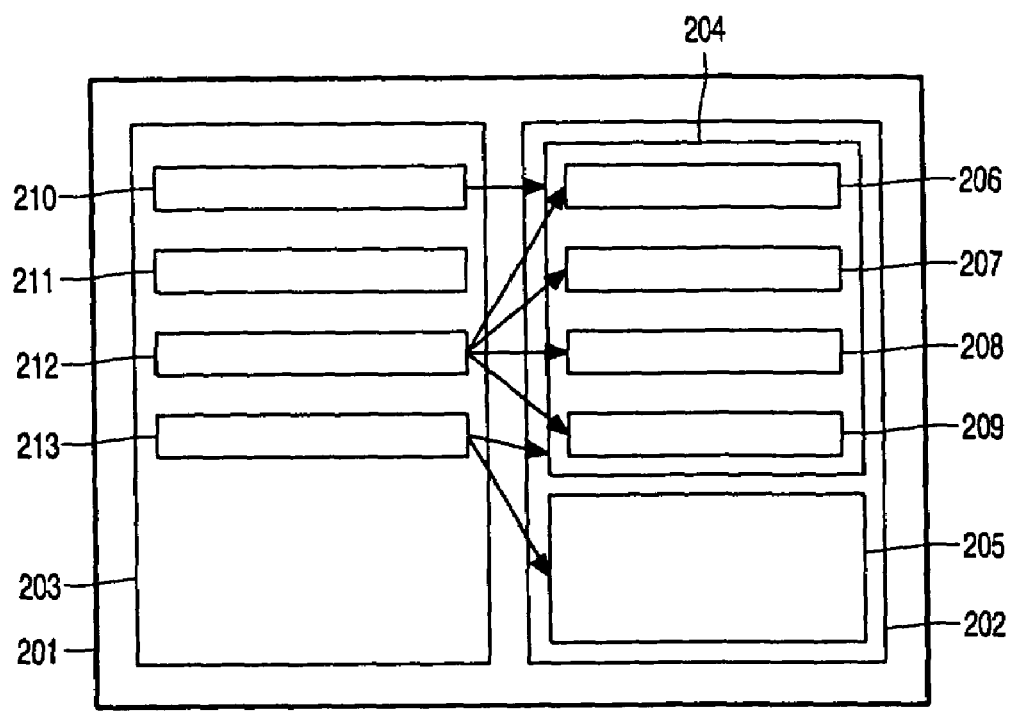
Figure 3:
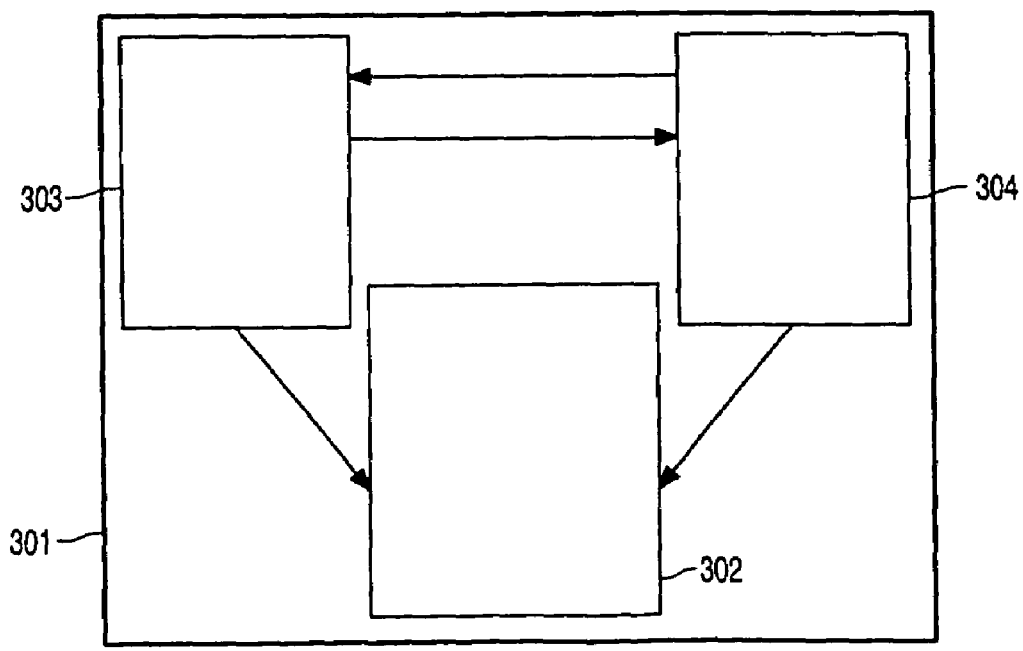
Figure 4:
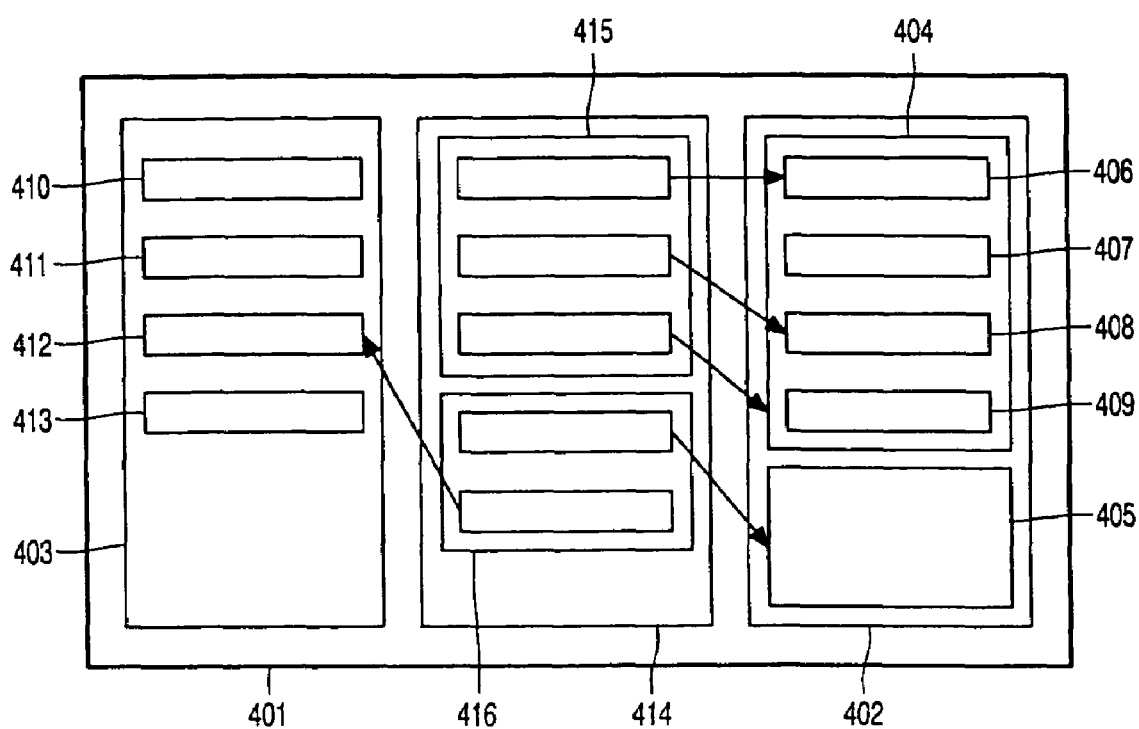

FIG. 1 schematically shows the environment in which the invention is applied,

FIG. 2 schematically shows the organization of a coded document according to the prior art, FIG. 3 schematically shows the organization of a coded document according to the invention, and FIG. 4 shows in more detail the organization of a coded document according to the invention.

DETAILED DESCRIPTION OF THE PREFERRED EMBODIMENTS

FIG. 1 schematically shows the environment in which the invention is applied. An author 102 uses a preparation system 104 to prepare and encode a document. The document may include text, images, audio and video composed together according to the specification of the author. The preparation system 104 generates a coded document 106 according to a certain format. The coded document 106 is also referred to as a multimedia document, since it may contain a number of different media types. The coded document 106 may be stored on an information carrier 108 for subsequent reproduction and distribution to users. The information carrier may be a CD-ROM, magnetic disk, tape or the like. A user 110 retrieves via a presentation apparatus 112, a copy 114 of the document from a local copy 116 of the information carrier. If the presentation apparatus is not suitable for presentation of a document in the format used, then a converter may be provided that converts the local copy 114 of the document into a format that can be handled by the presentation apparatus. Instead of converting the local copy 114, the converter may be located anywhere in the chain between the preparation system 104 and the presentation apparatus 112 or the local station 126, coding the document in the appropriate format. Alternative to storing the coded document 106 onto an information carrier, the coded document may be the storage device 118 of a server 120. A user 122 may later access the server via a network 124 to present the document on a local station 126. An example of this latter alternative is the usage of an HTML document which is loaded into a server and later accessed by a user via the Internet network.

FIG. 2 schematically shows the organization of a coded document according to the prior art. A coded document 201 comprises a structure section 202 and a style section 203. The structure section 202, also called the 'body section', comprises a number of document elements which are organized in a hierarchical way. At the highest level the structure section 202 comprises document elements 204 and 205 which may be, for example, chapters. The document element 204 comprises document elements 206, 207, 208 and 209 which may be, for example, paragraphs. Said document elements together constitute the document's content while their organization reflects the logical structure of the document.

The style section 203 comprises a number of style rules, being the style rules 210, 211, 212 and 213, in the present example; each style rule applies to a document element selected from the structure section 202. A style rule may apply to a specific document element, to a specific class of document elements, or to a specific element type, etc. For example, style rule 210 applies specifically to the chapter 204, while style rule 212 applies to the element type 'paragraph', and style rule 213 applies to the element class 'chapter.'.

The selection of a document element from the structure section 202 may be performed by means of CSS. A selected document element can then be assigned certain properties. The following example illustrates the use of CSS:

```
(1)     <html>
(2)     <head>
(3)         <style type = "text/css">
(4)             H1 {
(5)                 font-variant: small-caps;
(6)             }
(7)             .ctr {
(8)                 text-align: center;
(9)                 font-weight: bold;
(10)            }
(11)        </style>
(12)    </head>
(13)    <body>
(14)        <H1>Example of header text</H1>
(15)        <p>paragraph of text</p>
(16)        <p class="ctr">paragraph of class 'ctr'</p>
(17)    </body>
(18)    </html>
```

Lines 1 and 18 define the beginning and the end, respectively, of a coded ITML document. Lines 13 and 17 define the beginning and the end, respectively, of the body section. The body section defines the logical structure of the document which in the present example comprises a header text and two paragraphs of text. The header text of the predefined HTML element type 'H1' is defined in line 14. A first paragraph is defined in line 15, and a second paragraph of a user-defined class 'ctr' is defined in line 16.

Lines 3 and 11 define the beginning and the end, respectively, of the style section. Line 3 further specifies that CSS is used, indicated by 'type="text/css"'. The style section of the example comprises two style rules. The first style rule is defined by the lines 4 to 6 and assigns the font-variant 'small-caps' to the element type H1. The second style rule is defined by the lines 7 to 10 and specifies, by means of the 'dot' operator, that a document element of the class 'ctr' is to be presented in a center-aligned way and in bold face. The two selection mechanisms described may also be combined, for example H1.ctr selects a H1-type header belonging to the 'ctr' class.

It has been proposed to allow also timing properties to be assigned to document elements selected through CSS. For example, a property "duration: 3 s" could be assigned to a document element, indicating that the element should be presented for three seconds. As described hereinbefore, a disadvantage of this approach is that the time specification depends on information in the document's structure section, so that the document's logical structure also determines the document's temporal behavior.

FIG. 3 schematically shows the organization of a coded document according to the invention. A coded document 301 comprises a structure section 302 and a style section 303. Each style rule of the style section 303 selects a document element of the structure section 302. Additionally, the coded document 301 comprises a time section 304, which comprises time constraints, or time relations, which select elements from the structure section 302 and/or the style section 303. Style rules of the style section 303 may also refer to elements of the time section 304.

FIG. 4 shows in more detail the organization of a coded document according to the invention. A coded document 401 comprises a structure section 402, comprising document elements 404 to 409, and a style section 403, comprising style rules 410 to 413, similar to previous examples. A time section 414 comprises, for example, two time constraints 415 and 416. The time constraint 415 selects the document elements 406, 408 and 404, respectively. For example, the time constraint 415 may be a temporal sequence which shows said document elements consecutively. Note that the order of the document elements within the time constraint 415 does not correspond to the logical order defined in the structure section 402. Furthermore, said elements do not have the same level in the structure section 402; for example, the document elements 406 and 408 are subordinate to the document element 404. The time constraint 416 selects the document element 405 from the structure section 402 and the style rule 412 from the style section 403, respectively, thus ensuring that the application of the style rule 412 is related to the presentation of the document element 405. For example, the time constraint 416 may specify that the style rule 412 is only applicable during the presentation of document element 405.

The following example of a coded HTML document shows how time constraints are defined and document elements are selected while using CSS-style syntax.

```
(1)     <html>
(2)     <head>
(3)         <style type = "text/css">
(4)         ...
(5)         </style>
(6)         <time>
(7)             <seq type="append">
(8)                 #Chapter_1 {dur: 5;}
(9)                 <seq type="substitute"; repeat="indefinite">
(10)                    #Paragraph_1.1 {type="inherit"; dur: 7;}
(11)                    #Paragraph_1.2 {type="inherit"; dur: 6;}
```

-continued

```
(12)                </seq>
(13)             </seq>
(14)         </time>
(15)     </head>
(16)     <body>
(17)         <div id = "Chapter_1">
(18)             Text fragment 1
(19)             <div id = "Paragraph_1.1">
(20)                 Text fragment 1.1
(21)             </div>
(22)             <div id = "Paragraph_1.2">
(23)                 Text fragment 1.2
(24)             </div>
(25)         </div>
(26)         <div>
(27)             Text fragment 2
(28)         </div>
(29)     </body>
(30) </html>
```

Lines 3 and 5 define the beginning and the end, respectively, of the style section. Line 4 symbolizes that various lines of the coded style section have been omitted from the example.

Lines 16 and 29 define the beginning and the end, respectively, of the body section. The document is structured into two chapters: Chapter_1 and Chapter_2, the former chapter being subdivided into two paragraphs: Paragraph 1.1 and Paragraph 1.2.

Lines 6 and 14 define the beginning and the end, respectively, of the time section. The time section comprises one time constraint, viz. a temporal sequence, indicated by the pair <seq> and </seq>, of a document element and another sequence. Said further sequence selects two document elements: Paragraph_1.1 and Paragraph_1.2. The '#' operator is used to select a specific element, identified by the identifier behind it, similar to the selection mechanisms of the style section as described hereinbefore. It should be noted that other syntax can also be applied, for example, mark-up like, such as '<selector element="Chapter_1" dur="5"/>'. While borrowing further from CSS syntax, properties can be assigned to the time constraint. In the present example the outer sequence is of the type 'append', while the inner sequence is of the type 'substitute'. The 'append' type indicates that the elements of the sequence do not overlap, while the 'substitute' type indicates that each element replaces (i.e. takes the same space of) the previous element of the sequence. It should be noted that properties like 'append' and 'substitute' could also be assigned while using the style section, thus 'styling' the time constraints of the time section. In the time section the '<seq>' constraint would be made a member of a class 'append'. The style section would define a rule to that class 'append'.

The effect of the time section of the example is that first Text fragment 1 is presented for five seconds ('dur:5' in line 8). After five seconds, Text fragment 1.1 is also presented for seven seconds ('dur:7' in line 10), which is then replaced by Text fragment 1.2 which is presented for six seconds ('dur:6' in line 11). The inner sequence is repeated indefinitely ('repeat="indefinite"' in line 9), i.e. Text fragment 1.1 succeeds Text fragment 1.2 again. The property of indefinite repetition could make the sequence's type 'substitute' by default, so that not specifying the type would not result in a document of excessive length. The 'inherit' property in lines 10 and 11 indicate that possible subordinate paragraphs (not shown) of Paragraph_1.1 and Paragraph_1.2 are subject to the time constraint too. Note that the time constraints are independent of the document's structure. The elements of the inner sequence may as well be interchanged or selected from another chapter of the document.

The following example of a coded HTML document shows how time constraints of the time section may be coupled to style rules of the style section:

```
(1)     <html>
(2)     <head>
(3)         <style>
(4)             .column-left@t1 {
(5)                 left: 0;
(6)                 right: 50%;
(7)             }
(8)             .column-right@t2 {
(9)                 left: 50%;
(10)                right: 100%;
(11)                font-weight: bold;
(12)            }
(13)            .column-right@t3 {
(14)                left: 50%;
(15)                right: 100%;
(16)                font-weight: normal;
(17)            }
(18)        </style>
(19)        <time>
(20)            <par>
(21)                style[t1] { }
(22)                <seq>
(23)                    style[t2] {dur: 5}
(24)                    style[t3] { }
(25)                </seq>
(26)            </par>
(27)        </time>
(28)    </head>
(29)    <body>
(30)        <h1>first section</h1>
(31)        <p class="column-left">...t e x t...</p>
(32)        <p class="column-right">...t e x t...</p>
(33)
(34)        <h1>second section</h1>
(35)        <p class="column-left">...t e x t...</p>
(36)        <p class="column-right">...t e x t...</p>
(37)    </body>
(38)    </html>
```

The style section comprises three style rules which carry a time ID (t1, t2 and t3) to be used for selection by the time constraints in the time section. The body section comprises text fragments which are to be formatted into a left column an a light column (indicated by the classes 'column-left' and 'column-right'). The time constraint specifies that, during the presentation of the two columns, the style of the right column changes from bold to normal font (after 5 seconds as specified in line 23), while the style of the left column does not change.

It is not an essential feature of the invention that the style section and the time section are distinct. The previous example could also be defined in a combined way:

```
(1)     <html>
(2)     <head>
(3)         <style>
(4)             <par>
(5)                 .column-left {
(6)                     left: 0;
(7)                     right: 50%;
(8)                 }
(9)                 <seq>
(10)                    .column-right {
(11)                        left: 50%;
(12)                        right: 100%;
(13)                        font-weight: bold;
(14)                    }
(15)                    .column-right {
(16)                        left: 50%;
(17)                        right: 100%;
(18)                        font-weight: normal;
(19)                    }
(20)                </seq>
(21)            </par>
(22)        </style>
(23)    </head>
(24)    <body>
(25)        <h1>first section</h1>
(26)        <p class="column-left">...t e x t...</p>
(27)        <p class="column-right">...t e x t...</p>
(28)
(29)        <h1>second section</h1>
(20)        <p class="column-left">...t e x t...</p>
(31)        <p class="column-right">...t e x t...</p>
(32)    </body>
(33)    </html>
```

In this example there is a need for explicit references between a time section and a style section, which saves the language constructs needed for their definition. It is still achieved that the temporal behavior can be described independently of the document's logical structure.

The invention can also be applied to define transitions and other temporal effects. For example, one could specify a fade-in fade-out transition:

```
(1)     <html>
(2)     <head>
(3)         <transition>
(4)             .fade-inout {
(5)                 effect: fade;
(6)                 dur: 2;
(7)             }
(8)         </transition>
(9)         <time>
(10)            <begin-after class="fade-inout">
(11)                #img_1 {dur: 10}
(12)                #img_2 {dur: 10}
(13)            </begin-after>
(14)        </time>
(15)    </head>
(16)    <body>
(17)        <img id="img_1"/>
(18)        <img id="img_2"/>
(19)    </body>
(20)    </html>
```

In the body section two images are defined: img_1 and img_2. In the time section it is defined that these two images are to be presented one after the other. The way these images succeed each other is defined in a transition section. Lines 3 and 8 define the beginning and the end, respectively, of the transition section.

Another approach for transitions is shown in the following example:

```
(1)     <html>
(2)     <head>
(3)         <style>
(4)             #moving-img {
(5)                 left: 0;
(6)                 top: 0;
(7)             }
(8)             .path@t1 {
```

```
(9)         left-begin: 0; top-begin: 0;
(0)         left-end: 100; top-end: 100;
(11)        }
(12)    </style>
(13)    <time>
(14)        <begin-with>
(15)            #caption { }
(16)            style[t1] {begin: 2; dur: 5;}
(17)        </begin-with>
(18)    </time>
(19)   </head>
(20)   <body>
(21)        <h1 id="caption">A Moving Image</h1>
(22)        <img id="moving-img" class="path"/>
(23)   </body>
(24)   </html>
```

Initially, the image and its caption are presented at fixed positions. After two seconds ('begin: 2' in line 16) from the initial situation ('<begin-with>') the image starts to move in accordance with the style as specified for the class 'path'. Within five seconds ('dur: 5' in line 16) the image moves along the line defined by the four parameters left-begin, top-begin, left-end and top-end.

Although the invention has been described with reference to particular illustrative embodiments, alternative versions and modifications are feasible within the scope of the inventive concept. Thus, for example, the time section and/or the style section need not be an integral part of the document. Instead, they can be included by reference and be located in different parts of a network, for example, another Internet site. The document itself may be distributed too. The style section and the time section may be separate or combined.

The word 'comprising' does not exclude the presence of other elements or steps than those listed in a claim.

In summary, the invention relates to a method of coding a document for presentation on a presentation apparatus, comprising a step of defining a body section which specifies a structure of said document in terms of document elements, for example chapters and paragraphs. The method according to the invention also comprises a step of defining a time section including a time constraint which acts upon document elements in the structure section, and a step of linking the time section with the structure section to establish the coding of the document. The time section describes the temporal behavior of the document elements in the body section.

The invention claimed is:

1. A computer-based method of coding a document for presentation on a presentation apparatus, comprising:
defining a structure section which specifies a structure for content of said document in terms of document elements, wherein the defining of the structure section includes defining the structure section in a hierarchical structured format which specifies the structure of said document in terms of said document elements;
defining a time section including a time constraint which acts upon document elements in the structure section, wherein the defining of the time section includes defining the time section in said hierarchical structured format that includes said time constraint, wherein the time constraint specifies that the document elements it acts upon have to be presented consecutively;
linking the time section with the structure section to establish the coding of the document, wherein the structure section and the time section are defined in separate sections, and wherein the coding of the document constitutes an hierarchical structured application;
defining a style section in the hierarchical structured format which includes style rules specifying properties of one or more document elements selected from the structure section, the time constraint acts upon a style rule of the style section, the linking including linking the time section, style section, and the structure section to establish structural, style, and temporal coding of the document, wherein the document elements in the structure section which are acted upon by the time constraint are selected by a CSS (Cascading Style Sheets) selector syntax; and
at least one of (i) presenting the coded document on a presentation apparatus and (ii) storing the coded document for subsequent presentation.

2. The method as claimed in claim 1, wherein the method also comprises assigning a substitution indicator to the time constraint which indicates whether the presentation space consumed by a document element has to disappear before presentation of a succeeding document element.

3. The method as claimed in claim 1, wherein the time constraint specifies that the document elements it acts upon have to be presented simultaneously.

4. The method as claimed in claim 1, wherein the method also comprises assigning a repetition indicator to the time constraint which indicates how many times the time constraint should be applied.

5. The method as claimed in claim 1, further comprising including into the structure section a hierarchical relationship between a first and second one of the document elements, the second element being subordinate to the first element, and assigning an inheritance indictor to the time constraint which acts upon the first element, the inheritance indicator indicating that the time constraint also applies to the second element.

6. The method of presenting a coded document, which is coded in accordance with the method claimed in claim 1, comprising applying a time constraint of the time section to the document elements of the structure section which the time constraints acts upon.

7. A computer-based method of coding a document for presentation on a presentation apparatus, comprising:
defining a structure section which specifies a structure for content of said document in terms of document elements, wherein the defining of the structure section includes defining the structure section in XML (Extended Markup Language) format which specifies the structure of said document in terms of said document elements;
defining a time section including a time constraint which acts upon document elements in the structure section, wherein the defining of the time section includes defining the time section in said XML format that includes said time constraint, wherein the time constraint specifies that the document elements it acts upon have to be presented consecutively;
linking the time section with the structure section to establish the coding of the document, wherein the structure section and the time section are defined in separate sections and wherein the coding of the document constitutes an XML (Extended Markup Language) application;
defining a style section in the XML format which includes style rules specifying properties of one or more document elements selected from the structure section, the time constraint acts upon a style rule of the style section, the linking including linking the time section, style section, and the structure section to establish structural, style, and temporal coding of the document, wherein the document elements in the structure section which are acted upon by the time constraint are selected by a CSS (Cascading Style Sheets) selector syntax; and at least one of (i) presenting the coded document on a presentation apparatus and (ii) storing the coded document for subsequent presentation.

8. A computer-based method of coding a document for presentation on a presentation apparatus, comprising:

defining a structure section in a hierarchical structured format which specifies a structure of said document in terms of document elements, the structure section being disposed in a structural section containment structure;

defining a time section in said hierarchical structured format that includes a time constraint, the time section being disposed in a time section containment structure, wherein the time constraint specifies that the document elements it acts upon have to be presented consecutively;

linking the time section and the structure section to establish structural and temporal coding of the document, wherein the structure section and the time section are defined in separate sections and wherein the coding of the document constitutes an XML (Extended Markup Language) application;

defining a style section in the hierarchical structured format which includes style rules specifying properties of one or more document elements selected from the structure section, the time constraint acts upon a style rule of the style section, the linking including linking the time section, style section, and the structure section to establish structural, style, and temporal coding of the document, wherein the document elements in the structure section which are acted upon by the time constraint are selected by a CSS (Cascading Style Sheets) selector syntax; and at least one of (i) presenting the coded document on a presentation apparatus and (ii) storing the coded document for subsequent presentation.

9. The computer-based method claimed in claim 8, wherein the hierarchical structured format is selected from the group consisting of SGML, HTML, and XML.

10. The computer-based method claimed in claim 8 wherein the time constraint acts upon document elements of the structure section.

11. A computer-based method of coding a document for presentation on a presentation apparatus, the method comprising:

defining a structure section in an XML (Extended Markup Language) format which specifies a structure of said document in terms of document elements, the structure section being disposed in a structural section containment structure defined by the tag pair <body></body> with the structure section in the structured format being disposed between the starting tag <body> and the closing tag </body>;

defining a time section in said XML format that includes a time constraint, the time section being disposed in a time section containment structure, wherein the time constraint specifies that the document elements it acts upon have to be presented consecutively;

linking the time section and the structure section to establish structural and temporal coding of the document, wherein the structure section and the time section are defined in separate sections and wherein the coding of the document constitutes an XML (Extended Markup Language) application;

defining a style section in the XML format which includes style rules specifying properties of one or more document elements selected from the structure section, the time constraint acts upon a style rule of the style section, the linking including linking the time section, style section, and the structure section to establish structural, style, and temporal coding of the document, wherein the document elements in the structure section which are acted upon by the time constraint are selected by a CSS (Cascading Style Sheets) selector syntax; and at least one of (i) presenting the coded document on a presentation apparatus and (ii) storing the coded document for subsequent presentation.

* * * * *